(12) United States Patent
Wu et al.

(10) Patent No.: US 9,787,420 B2
(45) Date of Patent: Oct. 10, 2017

(54) BASE STATION, APPARATUS AND METHODS THEREIN FOR HANDLING UPLINK-TO-DOWNLINK INTERFERENCE BETWEEN UES

(71) Applicant: Telefonaktiebolaget LM Ericsson (publ), Stockholm (SE)

(72) Inventors: Yi Wu, Beijing (CN); Yunfei Wang, Sichuan (CN); Paul Peter Butovitsch, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/039,938

(22) PCT Filed: Nov. 28, 2013

(86) PCT No.: PCT/CN2013/088070
§ 371 (c)(1),
(2) Date: May 27, 2016

(87) PCT Pub. No.: WO2015/077963
PCT Pub. Date: Jun. 4, 2015

(65) Prior Publication Data
US 2017/0033881 A1 Feb. 2, 2017

(51) Int. Cl.
*H04W 76/04* (2009.01)
*H04J 11/00* (2006.01)
(Continued)

(52) U.S. Cl.
CPC ............ *H04J 11/0023* (2013.01); *H04L 5/14* (2013.01); *H04L 43/16* (2013.01);
(Continued)

(58) Field of Classification Search
CPC .. H04B 17/318; H04J 11/0023; H04L 69/324; H04L 43/16; H04L 5/14;
(Continued)

(56) References Cited

U.S. PATENT DOCUMENTS

2010/0159936 A1 6/2010 Brisebois et al.
2010/0255854 A1 10/2010 Lee et al.
(Continued)

FOREIGN PATENT DOCUMENTS

CN 102934497 A 2/2013
CN 103209415 A 7/2013
(Continued)

*Primary Examiner* — Thanh Le
(74) *Attorney, Agent, or Firm* — Murphy, Bilak & Homiller, PLLC

(57) ABSTRACT

Example embodiments presented herein are directed towards methods for handling uplink-to-downlink interference between a first UE served by a first BS and a second UE served by a second BS, the first BS and the second BS being with full-duplex mode. According to the methods, the first BS receives from the first UE information about a first received signal quality associated with the first BS and a second received signal quality associated with the second BS. The first BS generates a full-duplex interference list associated with the second BS by putting the first UE into the full-duplex interference list if a difference between the first received signal quality and the second received signal quality is smaller than a threshold. Example embodiments are also towards methods for scheduling downlink reception and methods for scheduling uplink transmission.

26 Claims, 12 Drawing Sheets

(51) Int. Cl.
*H04W 72/12* (2009.01)
*H04L 5/14* (2006.01)
*H04L 12/26* (2006.01)
*H04W 88/02* (2009.01)
*H04W 88/08* (2009.01)

(52) U.S. Cl.
CPC ..... *H04W 72/1231* (2013.01); *H04W 76/046* (2013.01); *H04W 88/02* (2013.01); *H04W 88/08* (2013.01)

(58) Field of Classification Search
CPC ... H04L 5/1461; H04L 5/0048; H04L 5/0066; H04W 52/04; H04W 72/1231; H04W 76/046; H04W 72/1273; H04W 72/044; H04W 88/02; H04W 88/08
See application file for complete search history.

(56) References Cited

U.S. PATENT DOCUMENTS

| | | | |
|---|---|---|---|
| 2013/0194984 A1* | 8/2013 | Cheng | H04W 72/082 370/294 |
| 2015/0312905 A1* | 10/2015 | Seo | H04B 17/318 370/280 |
| 2016/0269094 A1* | 9/2016 | Kim | H04W 4/06 |
| 2016/0329981 A1* | 11/2016 | Chung | H04L 5/14 |
| 2016/0359608 A1* | 12/2016 | Noh | H04L 5/1461 |

FOREIGN PATENT DOCUMENTS

| | | |
|---|---|---|
| WO | 2008130297 A1 | 10/2008 |
| WO | 2013004283 A1 | 1/2013 |
| WO | 2013049505 A1 | 4/2013 |
| WO | 2013107139 A1 | 7/2013 |

\* cited by examiner

BASE STATION, APPARATUS AND METHODS THEREIN FOR HANDLING UPLINK-TO-DOWNLINK INTERFERENCE BETWEEN UES

TECHNICAL FIELD

Example embodiments are directed towards a base station and an apparatus, and methods therein, for handling uplink-to-downlink interference between different user equipments served by different base stations, and for scheduling downlink reception or uplink transmission of a user equipment.

BACKGROUND

Full-duplex cellular system is introduced to increase capacity of cells. In the full-duplex cellular system, the base station of a cell works in a full-duplex mode where the base station simultaneously transmits and receives in the same frequency at the same time. The base stations of different cells usually work in the same frequency. In the full-duplex cellular system, a user equipment (UE) communicating with the base station (BS) may also work in a full-duplex mode. A patent application WO2013004283A1 provides a full-duplex cellular solution. According to this solution, a UE measures received signal characteristics from at least one other UE when the other UE is transmitting signals, and the measured received signal characteristics is comprised in measurement data. The UE transfers the measurement data to a BS, then the BS uses the measurement data for scheduling transmission of signals and reception of signals from and to the BS such that each UE that communicates via the BS either transmits signals to the BS using a first frequency interval or receives signals from said BS using the first frequency interval, and the BS transmits signals and receives signals simultaneously using the first frequency interval.

Due to the use of same resources blocks in uplink and downlink, extra inter-cell interference and intra-cell interference exist and would limit the capacity gain that can be reaped from the full-duplex designs. The extra interference caused by full-duplex designs has been elaborated in table 1.

TABLE 1

Extra interference caused by full-duplex cellular system

| Item | Interference | Aggressor | Victim |
|---|---|---|---|
| 1 | Intra-cell | BS downlink transmission | BS uplink reception |
| 2 | Intra-cell | UE uplink transmission | UE downlink reception |
| 3 | Inter-cell | BS downlink transmission | BS uplink reception |
| 4 | Inter-cell | UE uplink transmission | UE downlink reception |

The intra-cell interference between BS downlink transmission and uplink reception may be reduced by self-cancellation of the BS. The inter-cell interference between downlink transmission and uplink reception of different BSs may be reduced by downlink power control and beamforming solution. For the intra-cell between uplink transmission and downlink reception of different UEs within a same cell, a patent application WO2013107139A1 discloses a solution to reduce such interference. According to this solution, the BS obtains the interference degree when the BS and at least two UEs perform full-duplex transmission. Then the BS determines a UE capable of performing uplink and downlink signal transmission over the same time-frequency resource among the at least two UEs, according to the interference degree. In one example, the interference degree is determined based on the location information of UEs.

For inter-cell interference between uplink transmission and downlink reception between UEs of different cells, it is difficult to use the above solutions to reduce or eliminate the inter-cell interference. Therefore, a new method is needed to reduce the inter-cell interference between uplink transmission and downlink reception of UEs served by different BSs.

SUMMARY

An object of some example embodiments presented herein is to provide efficient solutions for reducing interference between uplink transmission and downlink reception of UEs served by different BSs. Accordingly, some of the example embodiments may be directed towards a method for handling uplink-to-downlink interference between a first UE served by a first BS and a second UE served by a second BS, the first BS and the second BS being with full-duplex mode. According to the method, the first BS receives from the first UE information about a first received signal quality associated with the first BS and a second received signal quality associated with the second BS. The first BS generates a full-duplex interference list associated with the second BS by putting the first UE into the full-duplex interference list if a difference between the first received signal quality and the second received signal quality is smaller than a threshold. By use of the generated full-duplex interference list, the downlink reception of the first UE and the uplink transmission of the second UE can be scheduled in different resources, thus reducing or eliminating the uplink-to-downlink interference.

Some of the example embodiments may be directed towards a method for scheduling uplink transmission of a second UE served by a second BS with full-duplex mode. According to the method, the second BS receives information indicating downlink reception is going to happen for a first UE served by a first BS with full-duplex mode. The first UE is in a full-duplex interference list associated with the second BS. The second BS determines whether the second UE is in a full-duplex interference list associated with the first BS. If it is determined that the second UE is in the list associated with the first BS, the second BS schedules the uplink transmission of the second UE before the first BS sends downlink data to the first UE, on a second resource that is different from a first resource for scheduling downlink reception of the first UE.

Some of the example embodiments may be directed towards a method for scheduling downlink reception of a first UE served by a first BS with full-duplex mode. According to the method, the first BS determines whether the first UE is in a full-duplex interference list associated with a second BS with full-duplex mode. If it is determined the first UE is in the full-duplex interference list, the first BS schedules the downlink reception of the first UE on a first resource that is different from a second resource for scheduling uplink transmission of any second UE served by the second BS. The second UE is in a full-duplex interference list associated with the first BS.

Some of the example embodiments may be directed towards a method for handling uplink-to-downlink interference between a first UE served by a first BS and a second UE served by a second BS, the first BS and the second BS being with full-duplex mode. According to the method, a network node communicating with both the first BS and the second BS determines whether the first UE is in a full-duplex interference list associated with the second BS. If it is determined the first UE is in the full-duplex interference list, the network node sends to the second BS information indicating the downlink reception is going to happen for the first UE, at a first predetermined time before downlink reception for the first UE begins.

Some of the example embodiments may be directed towards a BS for handling uplink-to-downlink interference between a first UE served by it and a second UE served by a second BS. Both the BS and the second BS are being with full-duplex mode. The BS includes a receiving unit and a generating unit. The receiving unit is configured to receive from the first UE information about a first received signal quality associated with the BS and a second signal quality associated with the second BS. The generating unit is configured to generate a full-duplex interference list associated with the second BS by putting the first UE into the full-duplex interference list if a difference between the first received signal quality and the second received signal quality is smaller than a threshold.

Some of the example embodiments may be directed towards a BS for scheduling uplink transmission of a second UE served by the BS. The BS includes a receiving unit, a determining unit and a scheduling unit. The BS is being with full-duplex mode. The receiving unit is configured to receive information indicating downlink reception is going to happen for a first UE served by a first BS with full-duplex mode. The first UE is in a full-duplex interference list associated with the BS. The determining unit is configured to determine whether the second UE is in a full-duplex interference list associated with the first BS. If the determining unit determines the second UE is in the full-duplex interference list associated with the first BS, the scheduling unit is configured to schedule the uplink transmission of the second UE before the first BS sends downlink data to the first UE, on a second resource that is different from a first resource for scheduling downlink reception of the first UE.

Some of the example embodiments may be directed towards a BS for scheduling downlink reception of a first UE served by the BS. The BS includes a determining unit and a scheduling unit. The BS is being with full-duplex mode. The determining unit is configured to determine whether the first UE is in a full-duplex interference list associated with a second BS with full-duplex mode. If the determining unit determines the first UE is in the full-duplex interference list, the scheduling unit is configured to schedule the downlink reception of the first UE on a first resource that is different from a second resource for scheduling uplink transmission of any second UE served by the second base station. The any second UE is in a full-duplex interference list associated with the BS.

Some of the example embodiments may be directed towards an apparatus for handling uplink-to-downlink interference between a first UE served by a first BS and a second UE served by a second BS. The first BS and the second BS are being with full-duplex mode. The apparatus includes a determining unit and a sending unit. The determining unit is configured to determine whether the first UE is in a full-duplex interference list associated with the second BS. If the determining unit determines that the first UE is in the list, the sending unit is configured to send to the second BS information indicating the downlink reception is going to happen for the first UE, at a first predetermined time before downlink reception for the first UE begins. Preferably, the sending unit is configured to send the information at a second predetermined time before the first BS sends to the first UE a signalling for establishing downlink connection.

According to embodiments of this disclosure, if the first UE is in the full-duplex interference list associated with the second BS and the second UE in the full-duplex interference list associated with the first BS, the uplink transmission of the second UE and the downlink reception of the first UE will be scheduled in different resources, so that the uplink-to-downlink interference between the first UE and the second UE will be efficiently reduced or even eliminated.

BRIEF DESCRIPTION OF THE DRAWINGS

The foregoing will be apparent from the following more particular description of the example embodiments, as illustrated in the accompanying drawings. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1:
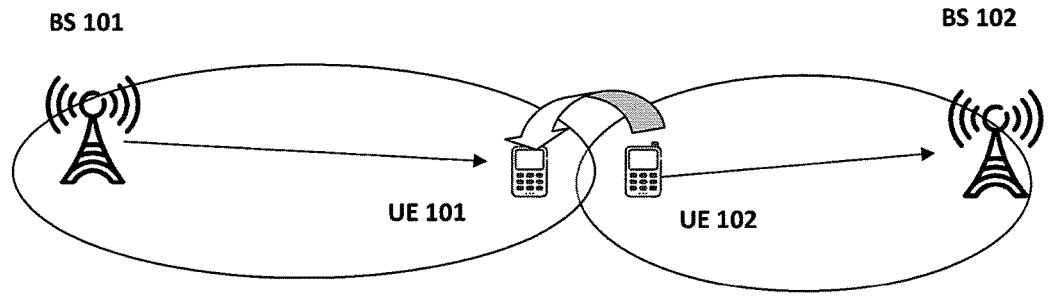
FIG. 1 is an illustrative example of scenario of uplink-to-downlink interference between inter-cell UEs.
Figure 2:
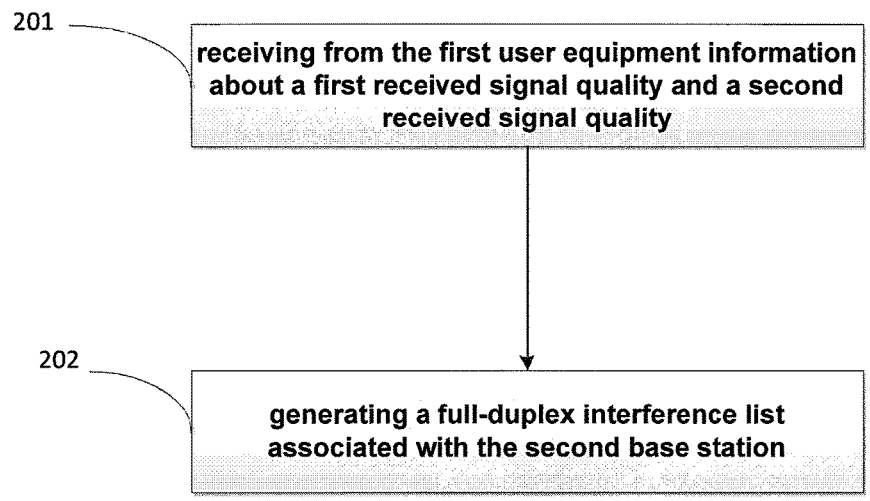
FIG. 2 is a flowchart depicting example of handling uplink-to-downlink interference between UEs served by different BSs.

FIG. 1 shows the scenario of uplink-to-downlink interference between UEs of different cells. UE 101 is served by BS 101, and UE 102 is served by BS 102. Both BS 101 and BS 102 are working with full-duplex mode, and BS 101 and BS 102 transmit and receive signals at the same frequency. When UE 101 is receiving signals from BS 101, UE 102 is transmitting signals to BS 102. Thus, downlink reception of UE 101 interferes with uplink transmission of UE 102. Similarly, downlink reception of UE 102 will interfere with uplink transmission of UE 101.

In order to solve the problem described above, some embodiments of this disclosure provide a method for handling uplink-to-downlink interference between a first UE served by a first BS and a second UE served by a second BS, the first BS and the second BS being with full-duplex mode.

According to the method, the first BS receives from the first UE information about a first received signal quality associated with the first BS and a second received signal quality associated with the second BS (Block 201). The first BS generates a full-duplex interference list associated with the second BS by putting the first UE into the full-duplex interference list if a difference between the first received signal quality and the second received signal quality is smaller than a threshold (Block 202). The uplink-to-downlink interference between the first UE and the second UE may be the interference between uplink transmission of the first UE and downlink reception of the second UE, and may also be the interference between downlink reception of the first UE and uplink transmission of the second UE. For two UEs, a non-negligible interference usually occurs between uplink data transmission and downlink data reception, but sometimes may occur between uplink control information/signalling transmission and downlink data reception, between uplink control information/signalling transmission and downlink control information/signalling reception, or between uplink data transmission and downlink control information reception. For a serving BS, the full-duplex interference list is a list of UEs which would generate non-negligible uplink-to-downlink interference to its neighbour BS. The full-duplex interference list associated with the second BS, which is generated by the first BS, includes a list of UEs being served by the first BS and having non-negligible uplink-to-downlink interference to some UEs served by the second BS. What extent of interference is non-negligible interference depends on the operator's need, and may be indicated by a choice of appropriate threshold used in Block 202. The full-duplex interference list associated with the first BS, which is generated by the second BS, includes a list of UEs being served by the second BS and having non-negligible uplink-to-downlink interference to some UEs served by the first BS. Downlink reception of any UE in the full-duplex interference list associated with the second BS is to be scheduled on a first resource that is different from a second resource for scheduling uplink transmission of any UE in the full-duplex interference list associated with first BS. Downlink reception here usually is the downlink data reception, but sometimes may include downlink control information or downlink signalling reception. Uplink transmission here usually is the uplink data transmission, but sometimes may include uplink control information or uplink signalling transmission.

Figure 3:
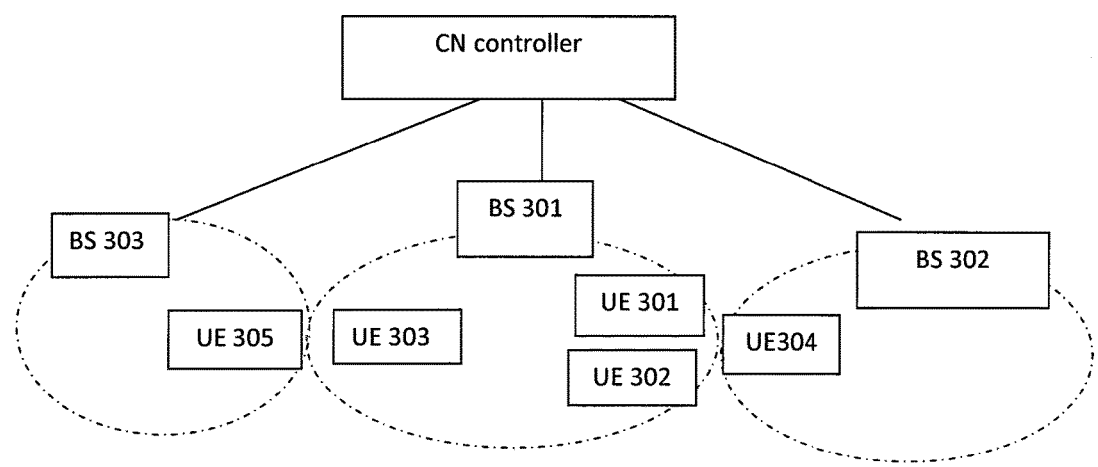
FIG. 3 is an illustrative example of handling uplink-to-downlink interference between UEs served by different BSs.

In order to illustrate the method above, a network shown in FIG. 3 is given as an example. As shown in FIG. 3, three are three base stations BS 301, BS 302 and BS 303. All these base stations are deployed with full-duplex mode. UE 301, UE 302 and UE 303 are served by BS 301. BS 301 and BS 302 are neighbour cells each other, and BS 301 and BS 303 are neighbour cells each other. UE 304 is served by BS 302, and UE 305 is served by BS 303. It should be noted that there may be other BSs in the network, and there may be other UEs served by BS 301, BS 302 or BS 303.

BS 301 receives from UE 301 information about a first received signal quality associated with its serving BS (e.g. BS301) and a second received signal quality associated with its neighbour BS (e.g. BS302). For UE 301, the first received signal quality associated with a serving BS or from a serving BS is the quality of a signal received from the serving BS, and the second received signal quality associated with a neighbour BS or from a neighbour BS is the quality of a signal received from the neighbour BS. For UE 302 and UE 303, similar actions are performed. One example of information about received signal quality is Reference Signal Receiving Power (RSRP). The information about received signal quality may be indicated by other parameters, such as Received Signal Code Power (RSCP) or Received Signal Strength Indication (RSSI). A UE may periodically report to its serving BS the information about received signal quality.

After receiving the information about the first received signal quality and the second received signal quality, BS 301 generates the full-duplex interference list by comparing the difference between the two received signal qualities with a threshold. The set of the threshold is usually related to the uplink power control mechanism. For instance, different systems like CDMA or OFDM would have different power control mechanism and therefore the tolerant inter-cell full-duplex interference would be different.

Take UE 301 as an example. A threshold T is predetermined. The value of RSRP associated with BS 301 is A dB, and the value of RSRP associated with BS 302 is B dB. With respect to the pair of serving BS 301 and neighbour BS 302, the difference between the first received signal quality and the second received signal quality is A-B. It should be noted that the signal strength from the serving BS is usually stronger than from the neighbour BS, so the difference between the first received signal quality and the second received signal quality is usually A-B. If the latter is stronger than the former, then the difference should be B-A. It should also be noted that, for other parameters indicating information of received signal quality, the difference between them may be represented by other mathematical functions.

If the value of A-B is smaller than the threshold T, then UE 301 is put into the full-duplex interference list associated with BS 302. Similarly, UE 302 is also put into the full-duplex interference list associated with BS 302. With respect to the pair of serving BS 301 and neighbour BS 303, for UE 303, the difference between the first received signal quality associated with BS 301 and the second received signal quality associated with BS 303 is smaller than the threshold T, then UE 303 is put into the full-duplex interference list associated with BS 303. Similarly, for UE 304, the difference between received signal qualities separately associated with BS 301 and BS 302 is smaller than the threshold T and UE 304 is put into the full-duplex interference list associated with BS 301. For UE 305, the difference between received signal qualities separately associated with BS 301 and BS 303 is smaller than the threshold T and UE 305 is put into the full-duplex interference list associated with BS 301. It is preferred to use same threshold for generating full-duplex interference lists for different BSs in order to simplify configuration. But the thresholds may be different based on different demands of specific scenarios.

Table 2-1 shows the full-duplex interference list generated by BS 301. In this example, there are two interference lists in BS 301. One is the list associated with BS 302 and the other is the list associated with BS 303. For a full-duplex interference list in a serving BS, the interfering BS is the neighbour BS where some UEs interfere with the UEs in the list. Table 2-2 and 2-3 show the full-duplex interference lists separately generated by BS 302 and BS 303. It can be seen that a BS may generate multiple full-duplex interference lists separately associated with different neighbour BSs, and there may be more than one UE in a full-duplex interference list.

TABLE 2-1 full-duplex interference list generated by BS 301

Interfering BS id: BS 302
UE list: {UE301, UE302}

TABLE 2-1-continued full-duplex interference list generated by BS 301

Interfering BS id: BS303
UE list: {UE303}

TABLE 2-2 full-duplex interference list generated by BS 302

Interfering BS id: BS 301
UE list: {UE304}

TABLE 2-3 full-duplex interference list generated by BS 303

Interfering BS id: BS 301
UE list: {UE305}

For each neighbour cell, its BS (neighbour BS) maintains a full-duplex interference list, and the list may be reported to core network (CN), such as to a controller in the core network. In this way, the controller in the core network will keep a combined interference list which includes multiple lists separately associated with different pairs of serving BS and neighbour BS. Table 3 gives an example of the lists in the controller. The controller may be embedded in other devices or as part of other devices, such as Serving GPRS Support Node (SGSN) in WCDMA network, Mobility Management Entity (MME) or User Plane Entity (UPE) in LTE network. The controller may also be an independent device in the core network. The list in a BS may be updated periodically or triggered by events, and the report to core network may also be updated. It should be noted that for a pair of BSs, they are serving BS and neighbour BS each other. For example, the pair of (BS301, BS302) in table 3 indicates BS 301 is neighbour BS of BS 302, and vice versa.

TABLE 3 full-duplex list in the controller of core network

| (BS301, BS302) BS301{UE301, UE302} | BS302{UE304} |
| (BS301, BS303) BS301{UE303} | BS303{UE305} |

Some embodiments provide another method for scheduling uplink transmission of a second UE served by a second BS with full-duplex mode. According to the method, the second BS receives information indicating downlink reception is going to happen for a first UE served by a first BS with full-duplex mode. The first UE is in a full-duplex interference list associated with the second BS. The second BS determines whether the second UE is in a full-duplex interference list associated with the first BS. If it is determined that the second UE is in the list associated with the first BS, the second BS schedules the uplink transmission of the second UE before the first BS sends downlink data to the first UE, on a second resource that is different from a first resource for scheduling downlink reception of the first UE. The different sources may be different frequency resources, or different time resources, or both. For example, the frequency or time slot of the first resource is different from that of the second resource.

There are different ways for generating the full-duplex interference list. Preferably, the full-duplex interference list is generated by comparing the difference of received signal qualities with a threshold, as described in the foresaid methods. That is, each UE in the full-duplex interference list associated with the first BS or the second BS meets the requirement that a difference between received signal qualities separately from the first BS and the second BS is smaller than the threshold.

Some embodiments provide another method for scheduling downlink reception of a first UE served by a first BS with full-duplex mode. According to the method, the first BS determines whether the first UE is in a full-duplex interference list associated with a second BS with full-duplex mode. If it is determined the first UE is in the full-duplex interference list, the first BS schedules the downlink reception of the first UE on a first resource that is different from a second resource for scheduling uplink transmission of any second UE served by the second BS. The foresaid second UE is in a full-duplex interference list associated with the first BS. In a preferable example, each UE in the full-duplex interference list associated with the first BS or the second BS meets the requirement that a difference between received signal qualities separately from the first BS and the second BS is smaller than a threshold.

Some embodiments provide another method for handling uplink-to-downlink interference between a first UE served by a first BS and a second UE served by a second BS, the first BS and the second base station being with full-duplex mode. According to the method, a network node communicating with both the first BS and the second BS determines whether the first UE is in a full-duplex interference list associated with the second BS. If it is determined the first UE is in the full-duplex interference list, the network node sends to the second BS information indicating the downlink reception is going to happen for the first UE, at a first predetermined time before downlink reception for the first UE begins. In a preferable example, each UE in the full-duplex interference list associated with the first BS or the second BS meets the requirement that a difference between received signal qualities separately from the first BS and the second BS is smaller than the threshold.

Figure 4:
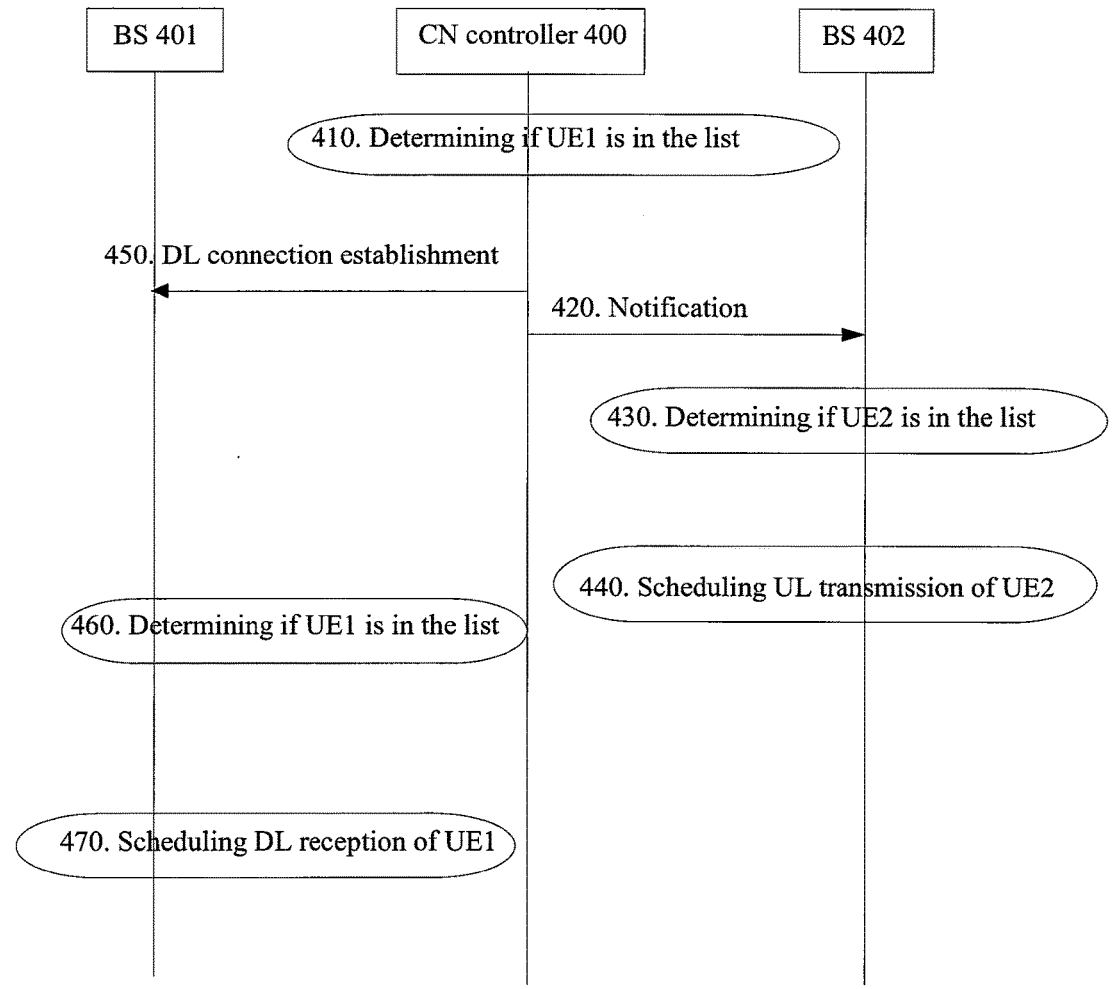
FIG. 4 is an illustrative example of procedure for handling uplink-to-downlink interference between UEs served by two BSs.

FIG. 4 provides an example of procedure for handling uplink-to-downlink interference between UEs served by two BSs. As shown in FIG. 4, if a UE1 served by BS 401 is going to begin downlink reception, CN controller 400 will determine if UE1 is in a full-duplex interference list (410). The full-duplex interference list stored in CN controller includes UEs which are served separately by a pair of BSs and will cause non-negligible uplink-to-downlink interference each other. An example for determining is that, CN controller 400 first finds out a UE list associated with BS 401 using ID of BS 401, then CN controller 400 checks if UE1 is in the list associated with BS 401 using ID of UE1. If UE1 is in the list, CN controller will further retrieve ID of the neighbour BS based on information in the pair of BSs. If it is determined that UE1 is in the list, and the neighbour BS is BS402, CN controller 400 will give a notification to BS 402 through sending to BS 402 information indicating the downlink reception is going to happen for UE1 (420). The notification may include the information of BS 401, if different resources are applied for scheduling UEs in the full-duplex interference list associated with different pairs. Alternatively, the notification may be communicated directly between a serving BS and its neighbour BS, without through the core network. For example, BS 401 may directly send the notification to BS 402.

The notification should be sent at a first predetermined time before the downlink reception of UE1 begins so as to effectively reduce the interference. The first predetermined time is used to ensure the scheduling for uplink transmission of UE2 occurs before BS 401 sends downlink data to UE1. The value of the first predetermined time is set usually based on estimation of time spending in steps 420 and 430, and may also be set based on estimation of time spending in others steps, such as steps 460 and 470. Preferably, the notification is sent at a second predetermined time before BS 401 sends to UE1 a signalling for establishing downlink connection. The signalling for establishing downlink connection may be Radio Resource Control connection (RRC) reconfiguration message, authentication message, or paging message. Alternatively, the time for sending the notification may take other events, such as step 470, as a reference. Alternatively, the timing of scheduling uplink transmission of UE2 could be achieved by controlling the timing of step 410.

From side of BS402, after receiving the information indicating downlink reception is going to happen for UE1, BS 402 will enter a special mode, which may be named as full-duplex inter-cell interference coordination (ICIC) mode. This indication may be achieved by a parameter with two different values. Under the full-duplex ICIC mode, for any UE2 served by BS 402, if UE2 is in the full-duplex interference list associated with BS 401, the uplink transmission of UE2 will be scheduled on a second resource difference from a first resource used for scheduling downlink reception of UE1. More specifically, when any UE2 served by BS 402 is going to start uplink transmission, BS402 will determine whether the UE2 is in the full-duplex interference list associated with BS 401(430). The full-duplex interference list associated with BS 401 is stored in BS 402. If it is determined that UE2 is in the list, BS 402 will schedule uplink transmission of UE2 in the second resource (440). For example, if downlink reception of UE1 is scheduled in a first frequency, then uplink transmission of UE2 will be scheduled in a second frequency so as to reduce or eliminate interference between uplink transmission of UE2 and downlink reception of UE1. In order to effectively reduce or eliminate the interference from uplink transmission of UE2 to downlink reception of UE1, it is better to schedule the uplink transmission of UE2 before BS 401 sends downlink data to UE1. Preferably, BS 401 schedules the uplink transmission of UE2 before BS 401 sends to UE1 the signalling for establishing downlink connection so as to not only reduce the interference to downlink data reception of UE1, but also reduce the interference to downlink signalling reception of UE1. Alternatively, BS 402 may schedule the uplink transmission of UE2 before BS 401 schedules downlink reception of UE1.

From side of BS 401, it receives downlink connection establishment information from ON controller 400 (450). After receiving this information, BS 401 determines whether UE1 is in the full-duplex interference list associated with BS 402 (460). If it is determined UE1 is in the list, BS 401 will schedule the downlink reception of UE1 on the first resource (470). The first resource is different from the second resource for scheduling uplink transmission of UE2.

For UEs served by BS 401, if more than one of them are in the full-duplex interference list associated with BS 402, it is preferred that downlink reception of these UEs in the list is scheduled within a same first resource. The downlink reception of these UEs in the list may be carried out on different sub-resources within the same first resource. Similarly, for UEs in the full-duplex interference list associated with BS 402, the uplink transmission of them may be carried out on different sub-resources within the same second resource.

To control the start and end of full-duplex ICIC mode, a full-duplex ICIC mode counter may be given. It is preferred that the full-duplex ICIC mode counter is stored in the CN controller. Take BS 402 for example, if the full-duplex ICIC counter for pair of (BS401, B5402) is 0, CN controller will send a notification to BS 402, and the full-duplex ICIC counter is increased by 1. When BS 402 receives the notification, it will enter the full-duplex ICIC mode where BS 402 schedules uplink transmission of UEs in the interference list associated with BS 401 on a different resource from that used by the UEs in the interference list associated with BS 402. If the full-duplex ICIC counter is larger than 0 which means BS 402 has already entered the full-duplex ICIC mode, there is no need to send notification. The full-duplex ICIC counter will be increased by 1.

For a UE in the list associated with BS 402, when the downlink session between the UE and BS 401 is released or downlink reception of the UE is finished, the full-duplex ICIC counter will be reduced by 1. In case that the counter reaches 0, the CN controller will send a notification of quit from the full-duplex ICIC mode to the BS 402. When BS 402 receives such a notification, it will quit from full-duplex ICIC mode and enter a normal mode where the scheduling for uplink transmission of UEs in the interference list associated with BS 401 is not restricted any more.

For a pair of serving BS and neighbour BS, a transmission pattern may be predetermined, which predetermines a first resource for scheduling downlink reception of UEs in the list associated with the neighbour BS and a second resource for scheduling uplink transmission of UEs in the list associated with the serving BS. For different pairs of serving BS and neighbour BS, the transmission pattern may predetermine a same first resource and a same second resource.

It should be noted that there is no strict order among the steps shown in FIG. 4, unless otherwise expressly provided to the contrary in the embodiments above.

Figure 5:
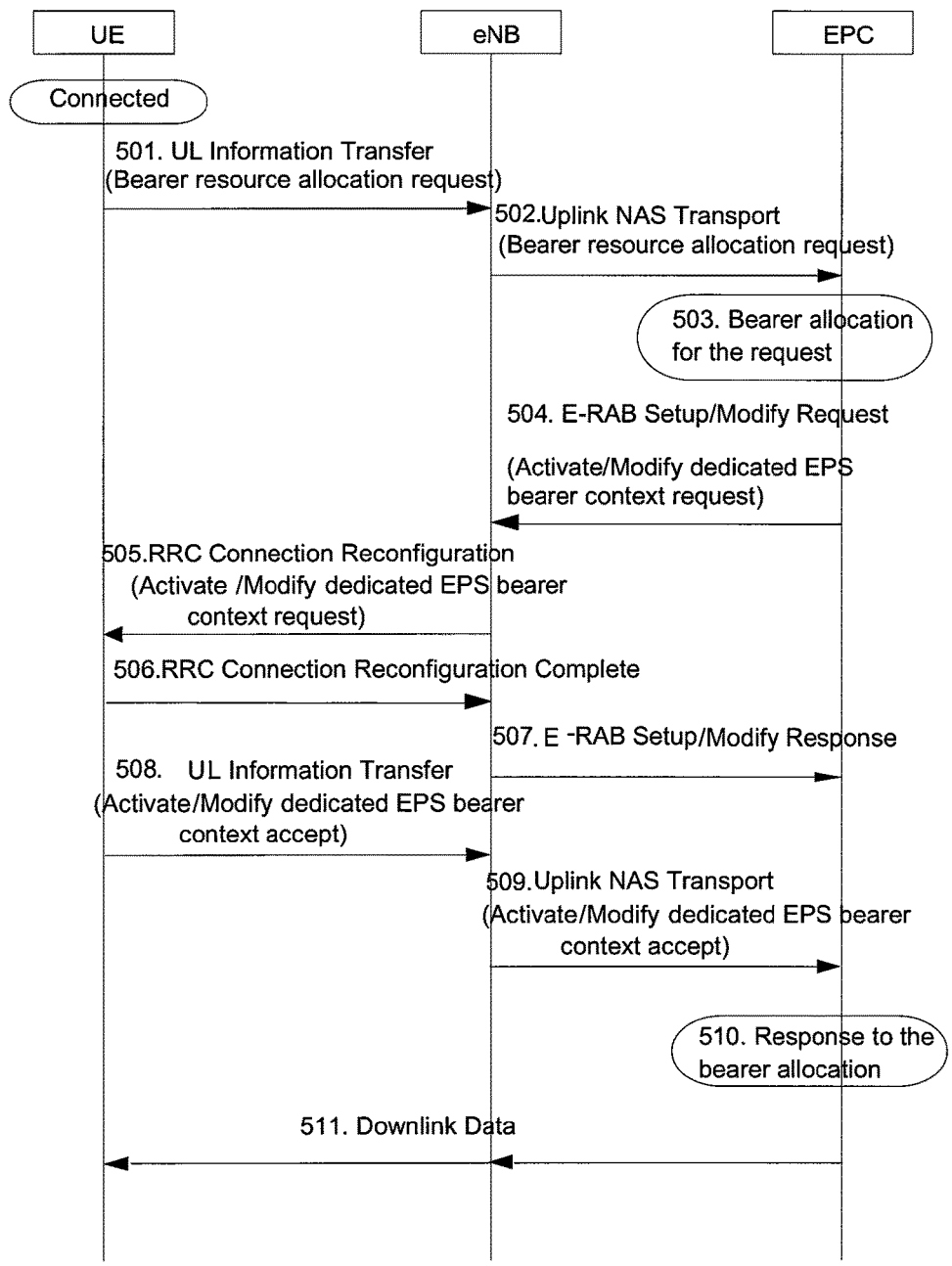
FIGS. 5 to 7 are illustrative examples of process for establishing EPS bearer.
Figure 6:
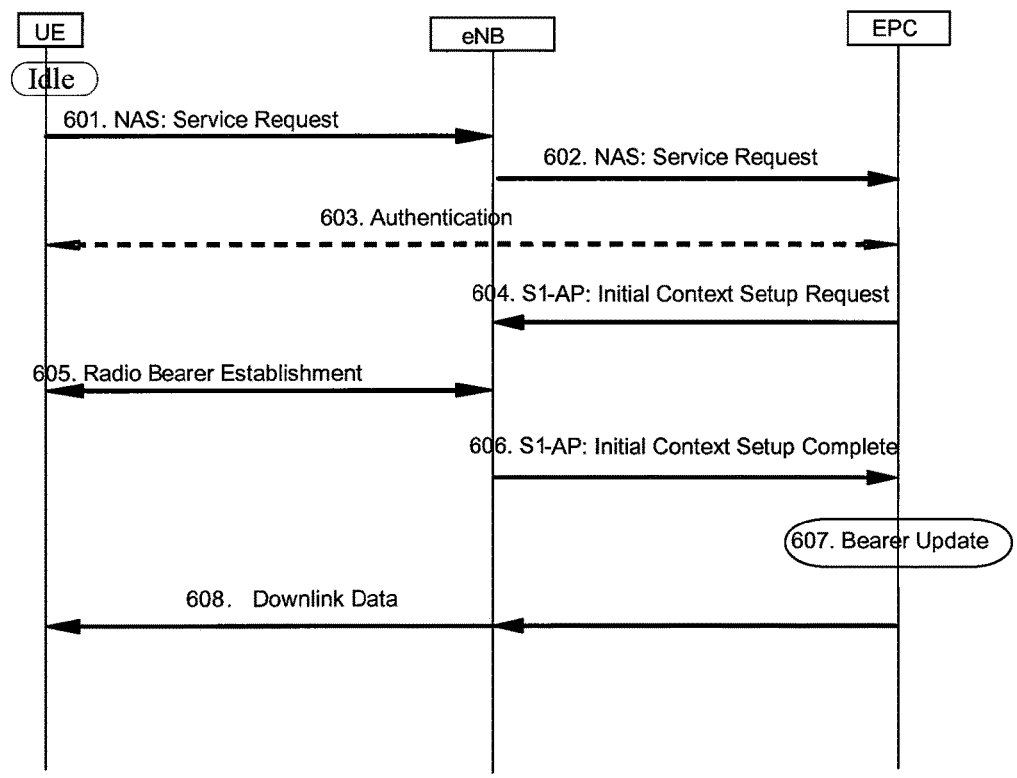
Figure 7:
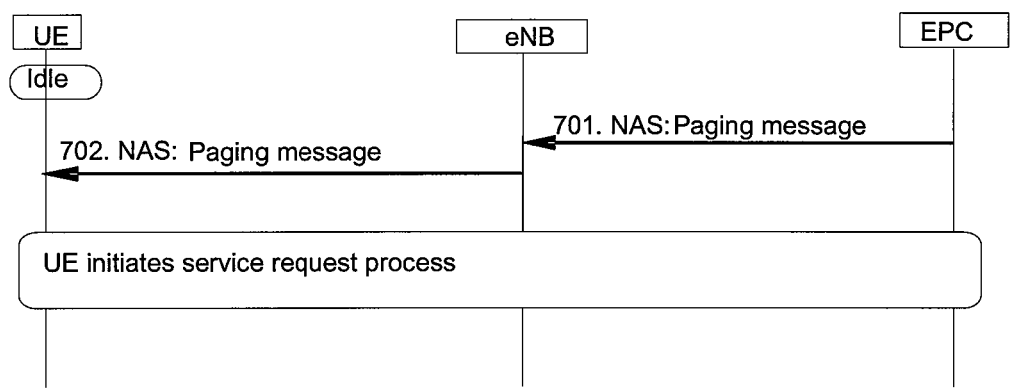

With reference to FIG. 5 to FIG. 7, interactions among UE, eNodeB (such as BS 401) and Evolved Packet Core (EPC) for establishing bear is illustrated. The timing for entering full-duplex ICIC mode and timing for quitting full-duplex ICIC mode in Long Term Evolution (LTE) system will be exemplified. In LTE system, the new downlink connection establishment should be detected by a new dedicated Evolved Packet System (EPS) bear establishment between core network and UE. The EPS bear establishment process may be different according to different UE states: connected and idle. For UE in the connected state, the EPS bear establishment process may be initiated at UE side or at core network side. If it is initiated at the UE side, the process is shown in FIG. 5. As shown in FIG. 5, the EPS bear is established through steps 501 to 510. If it is initiated at the core network side, step 501 and 502 may be skipped. After EPS bear establishment, the core network transmits downlink data to UE via eNodeB (511). The notification indicating the downlink reception is going to happen for UE1 in the embodiments above, such as the notification for notifying BS 402 of entering full-duplex ICIC mode, may be sent by CN controller 400 to BS 402 at the first determined time before step 511. Preferably, the notification is sent at the second predetermined time before step 505 where BS 401 sends to UE1 the RRC connection reconfiguration message, so that the interference of uplink transmission in BS 402 to the downlink signalling for establishing EPS bear will be alleviated or eliminated.

If the UE is in idle state, the EPS bearer establishment process is quite different between UE initiated process and core network initiated process. If the EPS bearer establishment is initiated by UE, the process is illustrated in FIG. 6. The EPS bearer is establishment through steps 601-607. After EPS bear establishment, the core network transmits downlink data to UE via eNodeB (608). The notification indicating the downlink reception is going to happen for UE1 in the embodiments above, such as the notification for notifying BS 402 of entering full-duplex ICIC mode, may be sent by CN controller 400 to BS 402 at the first determined time before step 608. Preferably, the notification is sent at the second predetermined time before step 603 where BS 401 sends to UE1 the authentication message. If the EPS bearer establishment is initiated by the core network, a paging process is needed because the UE is in idle state. The signalling process of paging is shown in FIG. 7 where step 701 and 702 are included. The notification may be sent at the second predetermined time before step 702 where BS 401 sends to UE1 the paging message.

Figure 8:
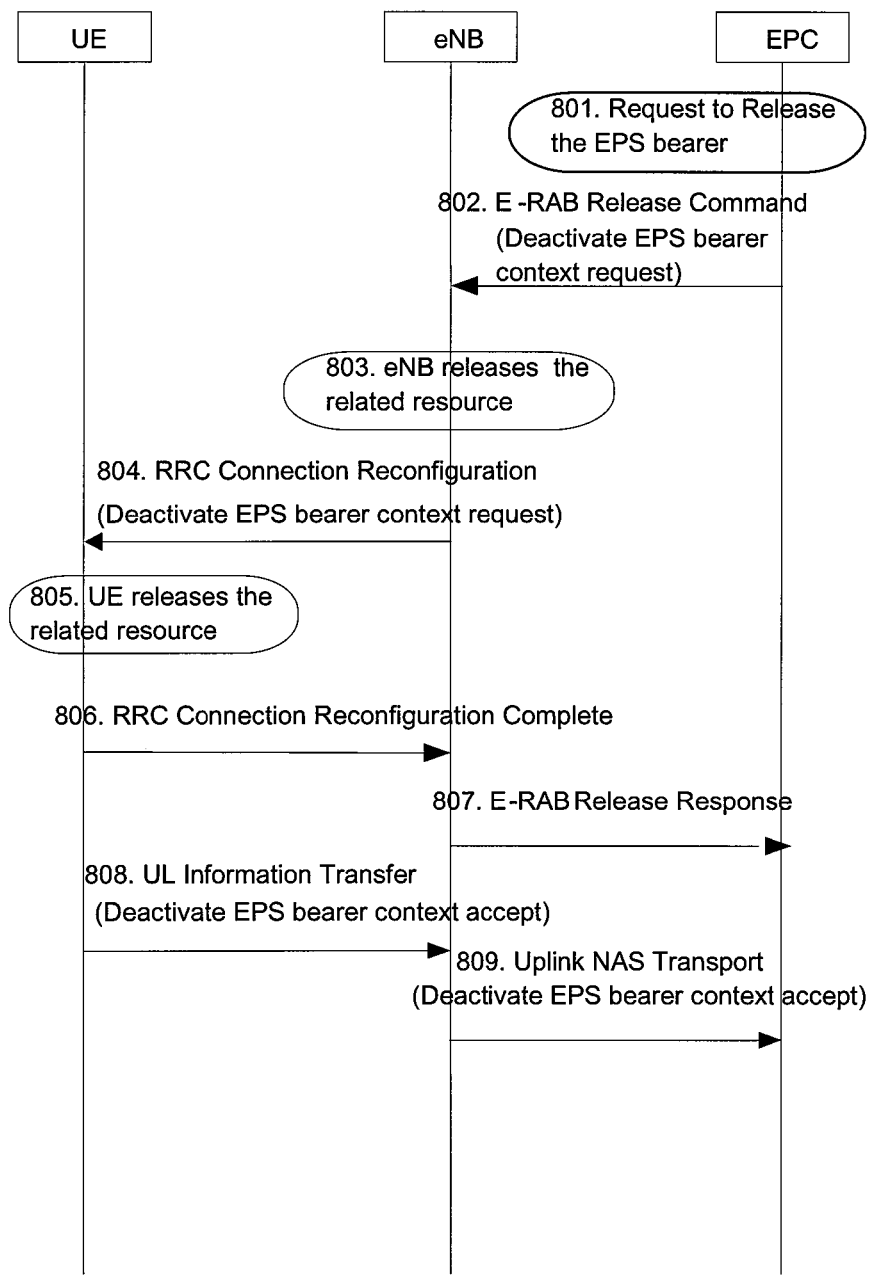
FIG. 8 is an illustrative example of procedure for releasing EPS bearer.

For a UE in connected state, the process for release of a data connection is shown in FIG. 8. The data connection is released through steps 801-809. The notification of quit from the full-duplex ICIC mode may be sent by CN controller 400 to BS 402 after step 809.

Figure 9:
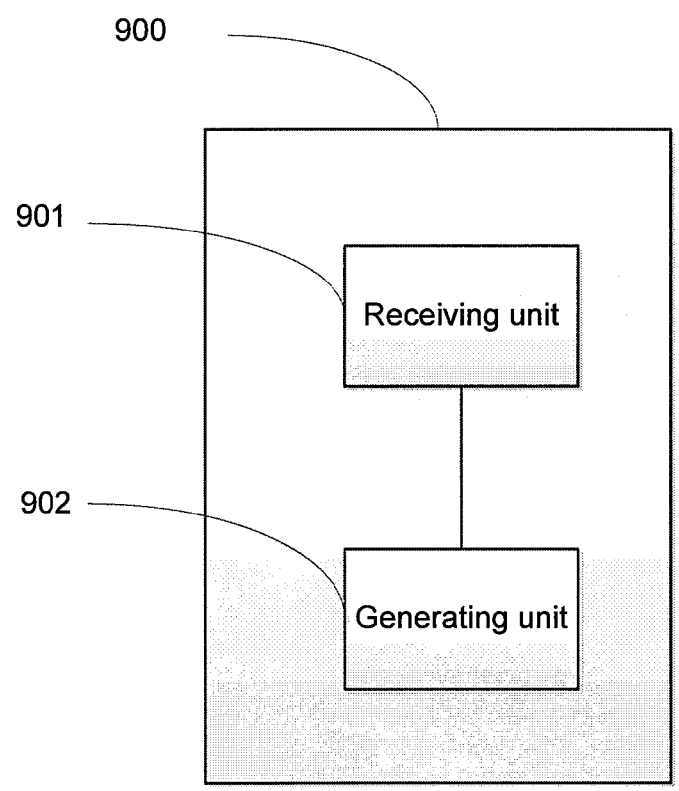
FIG. 9 is a schematic of a base station according to one embodiment.

In FIG. 9, a base station 900 (such as BS 401) includes a receiving unit 901 and a generating unit 902. The BS 900 is used for handling uplink-to-downlink interference between a first UE served by it and a second UE served by a second BS. Both the BS 900 and the second BS are being with full-duplex mode. The receiving unit 901 is configured to receive from the first UE information about a first received signal quality associated with the BS 900 and a second received signal quality associated with the second BS. The generating unit 902 is configured to generate a full-duplex interference list associated with the second BS by putting the first UE into the full-duplex interference list if a difference between the first received signal quality and the second received signal quality is smaller than a threshold. One example of information about the first received signal quality and the second received signal quality is RSRP. For the full-duplex interference list, downlink reception of any UE in the list associated with the second BS is to be scheduled on a first resource that is different from a second resource used by uplink transmission of any UE in a full-duplex interference list associated with the BS 900. The full-duplex interference list associated with the BS 900 is generated by the second BS.

Figure 10:
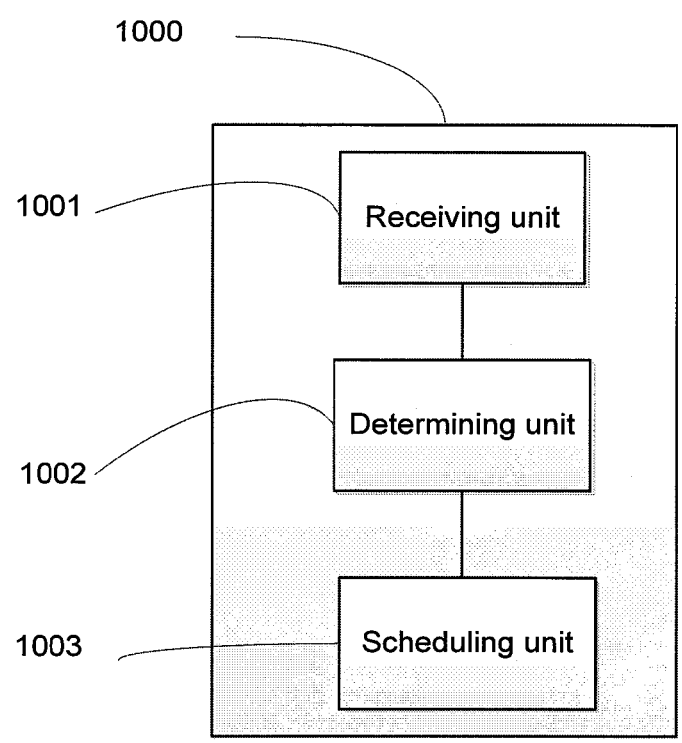
FIG. 10 is a schematic of a base station according to another embodiment.

In FIG. 10, a base station 1000 (such as BS 402) includes a receiving unit 1001, a determining unit 1002 and a scheduling unit 1003. The BS 1000 is used for scheduling uplink transmission of second UE served by the BS 1000. The BS 1000 is being with full-duplex mode. The receiving unit 1001 is configured to receive information indicating downlink reception is going to happen for a first UE served by a first BS with full-duplex mode. The first UE is in a full-duplex interference list associated with the BS 1000. The determining unit 1002 is configured to determine whether the second UE is in a full-duplex interference list associated with the first BS. If the determining unit 1002 determines the second UE is in the full-duplex interference list associated with the first BS, the scheduling unit 1003 is configured to schedule the uplink transmission of the second UE before the first BS sends downlink data to the first UE, on a second resource that is different from a first resource for scheduling downlink reception of the first UE. Preferably, the scheduling unit 1003 is configured to schedule the uplink transmission of the second UE before the first BS sends to the first UE a signalling for establishing downlink connection. For the full-duplex interference list, it is preferred that each UE in the full-duplex interference list associated with the first BS or the BS 1000 meets the requirement that a difference between received signal qualities separately from the first BS and the BS 1000 is smaller than a threshold.

Figure 11:
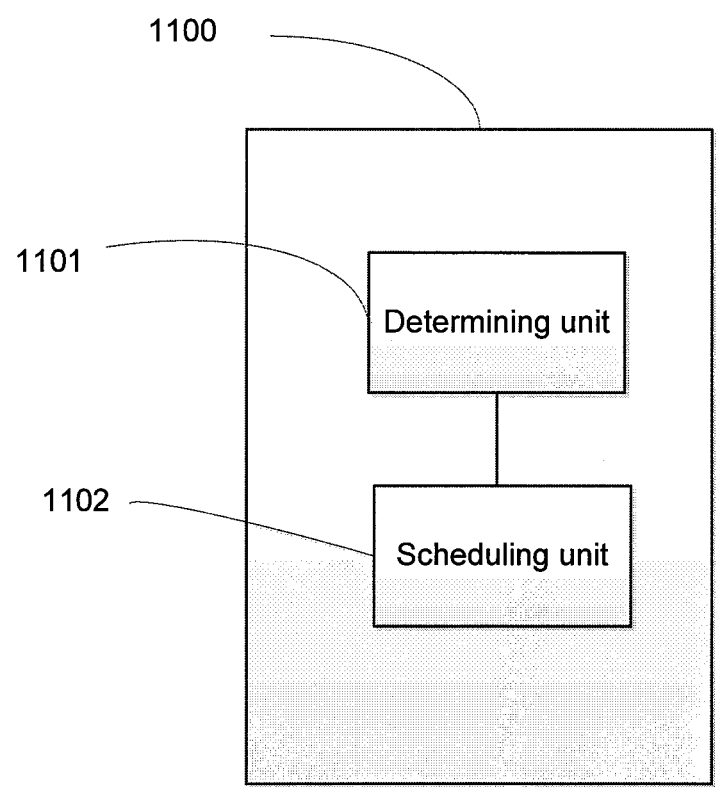
FIG. 11 is a schematic of a base station according to another embodiment.

In FIG. 11, a base station 1100 (such as BS 401) includes a determining unit 1101 and a scheduling unit 1102. The BS 1100 is used for scheduling downlink reception of a first UE served by the BS 1100. The BS 1100 is being with full-duplex mode. The determining unit 1101 is configured to determine whether the first UE is in a full-duplex interference list associated with a second BS with full-duplex mode. If the determining unit 1101 determines the first UE is in the full-duplex interference list, the scheduling unit 1102 is configured to schedule the downlink reception of the first UE on a first resource that is different from a second resource for scheduling uplink transmission of any second UE served by the second base station. The any second UE is in a full-duplex interference list associated with the BS 1100. Optionally, the BS 1100 may further include the receiving unit 901 and the generating unit 902.

Figure 12:
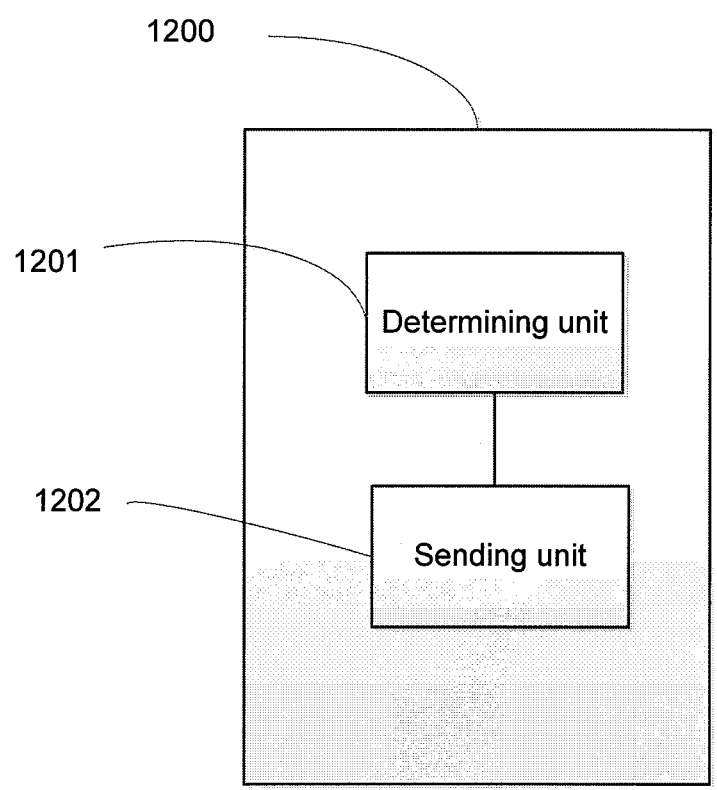
FIG. 12 is a schematic of apparatus according to one embodiment.

In FIG. 12, an apparatus 1200 includes a determining unit 1201 and a sending unit 1202. One example of the apparatus 1200 is the CN controller 400, a SGSN, a MME, ora UPE. The apparatus 1200 is used for handling uplink-to-downlink interference between a first UE served by a first BS and a second UE served by a second BS. The first BS and the second BS are being with full-duplex mode. The determining unit 1201 is configured to determine whether the first UE is in a full-duplex interference list associated with the second BS. If the determining unit 1201 determines that the first UE is in the list, the sending unit 1202 is configured to send to the second BS information indicating the downlink reception is going to happen for the first UE, at a first predetermined time before downlink reception for the first UE begins. Preferably, the sending unit 1102 is configured to send the information at a second predetermined time before the first BS sends to the first UE a signalling for establishing downlink connection. For the full-duplex interference list, each UE in the full-duplex interference list associated with the first BS or the second BS meets the requirement that a difference between signal qualities received separately from the first BS and the second BS is smaller than a threshold.

Figure 13:
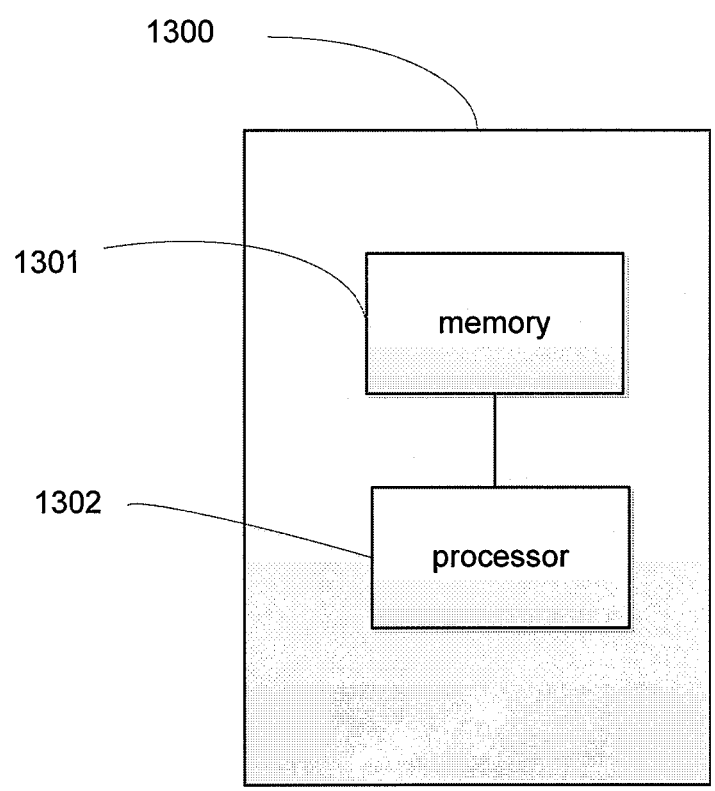
FIG. 13 is a schematic of apparatus according to another embodiment.

Some embodiments provide an apparatus for handling uplink-to-downlink interference between UEs served by different BSs. The apparatus comprises a memory and a processor. The memory contains instructions executable by the processor. The apparatus 1300 is operative to perform the steps of methods described in the embodiments above. In FIG. 13, an apparatus 1300 for handling uplink-to-downlink interference between UEs served by different BSs is illustrated. The apparatus 1300 includes a memory 1301 and a processor 1302. The memory 1301 contains instructions executable by the processor 1302. The apparatus 1300 is operative to perform the steps of methods described in the embodiments above. For example, the apparatus 1300 is operative to receive from the first UE information about the first received signal quality associated with the first BS and the second received signal quality associated with the second BS, and generate the full-duplex interference list associated with the second BS by putting the first UE into the full-duplex interference list if the difference between the first received signal quality and the second received signal quality is smaller than the threshold. In another example, the apparatus 1300 is operative to receive information indicating downlink reception is going to happen for the first UE, determine whether the second UE is in the full-duplex interference list associated with the first BS, and schedule the uplink transmission of the second UE before the first BS sends downlink data to the first UE if it is determined that the second UE is in the list associated with the first BS. In another example, the apparatus 1300 is operative to determine whether the first UE is in the full-duplex interference list associated with the second BS, and schedule the downlink reception of the first UE on the first resource if it is determined the first UE is in the list. In another example, the apparatus 1300 is operative to determine whether the first UE is in the full-duplex interference list associated with the second BS, and send to the second BS the information at the first predetermined time before downlink reception for the first UE begins, if it is determined the first UE is in the list.

Some embodiments provide an apparatus for handling uplink-to-downlink interference between two UEs served by two BSs. The apparatus comprises processing means operative to perform steps of methods described in the embodiments above.

It should be noted that the full-duplex interference list stored in a serving BS, a neighbour BS, or a CN controller may be generated based on the difference of received signal qualities, that is, each UE in the full-duplex interference list meets the requirement that a difference between received signal qualities separately from a serving BS and a neighbour BS is smaller than a threshold. However, the generation of the full-duplex interference list is not limited to this method, and may be achieved by other methods.

It should also be noted that the wordings such as "include", "including", "comprise" and "comprising" do not exclude elements or steps which are present but not listed in the description and the claims. It also shall be noted that as used herein and in the appended claims, the singular forms "a", "an", and "the" may include plural referents unless the context clearly dictates otherwise. The wording "base station" described above is a generalization of a node providing wireless access for a UE, is not limited to traditional base station, such as RBS and eNodeB, and may be wireless relays, WLAN access points or any other type. The UE described above may be with full-duplex mode, or half-duplex mode. The term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes Machine Type Communication (MTC) devices, which do not necessarily involve human interaction.

What is claimed is:

1. A method for handling uplink-to-downlink interference between a first user equipment served by a first base station and a second user equipment served by a second base station, the first base station and the second base station operating in full-duplex mode, the method comprising:
    receiving from the first user equipment information about a first received signal quality associated with the first base station and a second received signal quality associated with the second base station; and
    generating a full-duplex interference list associated with the second base station by putting the first user equipment into the full-duplex interference list if a difference between the first received signal quality and the second received signal quality is smaller than a threshold.

2. The method of claim 1, wherein the information about the first received signal quality and the second received signal quality is Reference Signal Received Power, Received Signal Code Power, or Received Signal Strength Indication.

3. The method of claim 1, wherein downlink reception of any user equipment in the full-duplex interference list associated with the second base station is to be scheduled on a first resource that is different from a second resource for scheduling uplink transmission of any user equipment in a full-duplex interference list associated with the first base station, the full-duplex interference list associated with the first base station being generated by the second base station.

4. A method for scheduling uplink transmission of a second user equipment served by a second base station with full-duplex mode, comprising:
    receiving information indicating downlink reception is going to happen for a first user equipment served by a first base station with full-duplex mode, wherein the first user equipment is in a full-duplex interference list associated with the second base station;
    determining whether the second user equipment is in a full-duplex interference list associated with the first base station; and
    scheduling the uplink transmission of the second user equipment before the first base station sends downlink data to the first user equipment, on a second resource that is different from a first resource for scheduling downlink reception of the first user equipment served by the first base station, if it is determined the second user equipment is in the full-duplex interference list associated with the first base station.

5. The method of claim 4, wherein scheduling the uplink transmission of the second user equipment before the first base station sends downlink data to the first user equipment comprising:
    scheduling the uplink transmission of the second user equipment before the first base station sends to the first user equipment a signaling for establishing downlink connection.

6. The method of claim 5, wherein the signaling for establishing downlink connection comprises Radio Resource Control connection reconfiguration message, authentication message, or paging message.

7. The method of claim 4, wherein the frequency or time slot of the second resource is different from that of the first resource.

8. The method of claim 4, wherein each user equipment in the full-duplex interference list associated with the first base station or the second base station meets a requirement that a difference between received signal qualities separately from the first base station and the second base station is smaller than a threshold.

9. A method for scheduling downlink reception of a first user equipment served by a first base station with full-duplex mode, comprising:
    determining whether the first user equipment is in a full-duplex interference list associated with a second base station with full-duplex mode;
    if it is determined the first user equipment is in the full-duplex interference list, scheduling the downlink reception of the first user equipment on a first resource that is different from a second resource for scheduling uplink transmission of any second user equipment served by the second base station, wherein said any second user equipment is in a full-duplex interference list associated with the first base station.

10. The method of claim 9, wherein each user equipment in the full-duplex interference list associated with the first base station or the second base station meets a requirement that a difference between received signal qualities separately from the first base station and the second base station is smaller than a threshold.

11. The method of claim 9, wherein the frequency or time slot of the first resource is different from that of the second resource.

12. A method for handling uplink-to-downlink interference between a first user equipment served by a first base station and a second user equipment served by a second base station, the first base station and the second base station operating in full-duplex mode, the method comprising:
  determining whether the first user equipment is in a full-duplex interference list associated with the second base station; and
  if it is determined the first user equipment is in the full-duplex interference list, sending to the second base station information indicating the downlink reception is going to happen for the first user equipment in the full-duplex interference list associated with the second base station, at a first predetermined time before downlink reception for the first user equipment begins.

13. The method of claim 12, sending to the second base station information at the first predetermined time before downlink reception for the first user equipment begins comprising:
  sending to the second base station information indicating the downlink reception is going to happen for the first user equipment, at a second predetermined time before the first base station sends to the first user equipment a signaling for establishing downlink connection.

14. The method of claim 13, wherein the signaling for establishing downlink connection comprises Radio Resource Control connection reconfiguration message, authentication message, or paging message.

15. The method of claim 12, wherein each user equipment in the full-duplex interference list associated with the first base station or the second base station meets a requirement that a difference between received signal qualities separately from the first base station and the second base station is smaller than a threshold.

16. A base station for handling uplink-to-downlink interference between a first user equipment served by the base station and a second user equipment served by a second base station, the base station and the second base station being with full-duplex mode, comprising:
  a receiving unit configured to receive from the first user equipment information about a first received signal quality associated with the base station and a second received signal quality associated with the second base station; and
  a generating unit configured to generate a full-duplex interference list associated with the second base station by putting the first user equipment into the full-duplex interference list if a difference between the first received signal quality and the second received signal quality is smaller than a threshold.

17. The base station of claim 16, wherein the information about the first received signal quality and the second received signal quality is Reference Signal Receiving Power, Received Signal Code Power, or Received Signal Strength Indication.

18. The base station of claim 16, wherein downlink reception of any user equipment in the full-duplex interference list associated with the second base station is to be scheduled on a first resource that is different from a second resource for scheduling uplink transmission of any user equipment in a full-duplex interference list associated with the base station, the full-duplex interference list associated with the base station being generated by the second base station.

19. A base station for scheduling uplink transmission of a second user equipment served by the base station, the base station being with full-duplex mode, comprising:
  a receiving unit configured to receive information indicating downlink reception is going to happen for a first user equipment served by a first base station with full-duplex mode, wherein the first user equipment is in a full-duplex interference list associated with the base station;
  a determining unit configured to determine whether the second user equipment is in a full-duplex interference list associated with the first base station; and
  a scheduling unit configured to schedule the uplink transmission of the second user equipment before the first base station sends downlink data to the first user equipment, on a second resource that is different from a first resource for scheduling downlink reception of the first user equipment served by the first base station, if the determining unit determines the second user equipment is in the full-duplex interference list associated with the first base station.

20. The base station of claim 19, wherein the scheduling unit is configured to schedule the uplink transmission of the second user equipment before the first base station sends to the first user equipment a signaling for establishing downlink connection.

21. The base station of claim 19, wherein each user equipment in the full-duplex interference list associated with the first base station or the base station meets the requirement that a difference between received signal qualities separately from the first base station and the base station is smaller than a threshold.

22. A base station for scheduling downlink reception of a first user equipment served by the base station with full-duplex mode, comprising:
  a determining unit configured to determine whether the first user equipment is in a full-duplex interference list associated with a second base station with full-duplex mode, and
  a scheduling unit configured to, if the determining unit determines the first user equipment is in the full-duplex interference list, schedule the downlink reception of the first user equipment on a first resource that is different from a second resource for scheduling uplink transmission of any second user equipment served by the second base station, wherein said any second user equipment is in a full-duplex interference list associated with the base station.

23. The base station of claim 22, wherein each user equipment in the full-duplex interference list associated with the base station or the second base station meets the requirement that a difference between received signal qualities separately from the base station and the second base station is smaller than a threshold.

24. An apparatus for handling uplink-to-downlink interference between a first user equipment served by a first base station and a second user equipment served by a second base station, the first base station and the second base station being with full-duplex mode, comprising:
  a determining unit configured to determine whether the first user equipment is in a full-duplex interference list associated with the second base station, and a sending unit configured to send to the second base station information indicating the downlink reception is going to happen for the first user equipment in the full-duplex interference list associated with the second base station, at a first predetermined time before downlink reception for the first user equipment begins, if the determining unit determines the first user equipment is in the full-duplex interference list.

25. The apparatus of claim 24, wherein the sending unit is configured to sending to the second base station information indicating the downlink reception is going to happen for the first user equipment, at a second predetermined time before the first base station sends to the first user equipment a signaling for establishing downlink connection.

26. The apparatus of claim 24, wherein each user equipment in the full-duplex interference list associated with the first base station or the second base station meets a requirement that a difference between received signal qualities separately from the first base station and the second base station is smaller than a threshold.

* * * * *